April 28, 1959  B. E. BAILEY  2,884,373
METHOD AND APPARATUS FOR HEATING FLUIDS
Filed Oct. 20, 1954  3 Sheets—Sheet 1

BRADFORD E. BAILEY INVENTOR.

BY
ATTORNEY

April 28, 1959      B. E. BAILEY      2,884,373
METHOD AND APPARATUS FOR HEATING FLUIDS
Filed Oct. 20, 1954      3 Sheets-Sheet 3

BRADFORD E. BAILEY *INVENTOR.*

BY *George J. Silhavy*

*ATTORNEY*

United States Patent Office 2,884,373
Patented Apr. 28, 1959

2,884,373

METHOD AND APPARATUS FOR HEATING FLUIDS

Bradford E. Bailey, Elizabeth, N.J., assignor to Esso Research and Engineering Company, a corporation of Delaware Application October 20, 1954, Serial No. 463,442

9 Claims. (Cl. 208—132)

This invention relates to a method and apparatus for changing the temperature of fluids and more particularly relates to heating hydrocarbon fluids.

Various furnace designs are known for heating hydrocarbon fluids and various arrangements of oil tubes are known to otain quick heating of hydrocarbon fluids to desired temperatures such as conversion or cracking temperatures. Fluid solids beds are known in various reactions for maintaining a substantially uniform temperature throughout the bed of fluidized solids.

According to the present invention separate fluid solids bed sections are used in series with circulation of solids in each bed section to secure countercurrent heat transfer between the hot combustion gases flowing upwardly through the bed sections and the oil flowing through tubes submerged in the fluid bed sections. The oil preferably flows in a general downward direction countercurrent to the upflowing hot combustion gases so that the temperature of the oil is increased as it passes in series through the bed sections.

Figure 1:
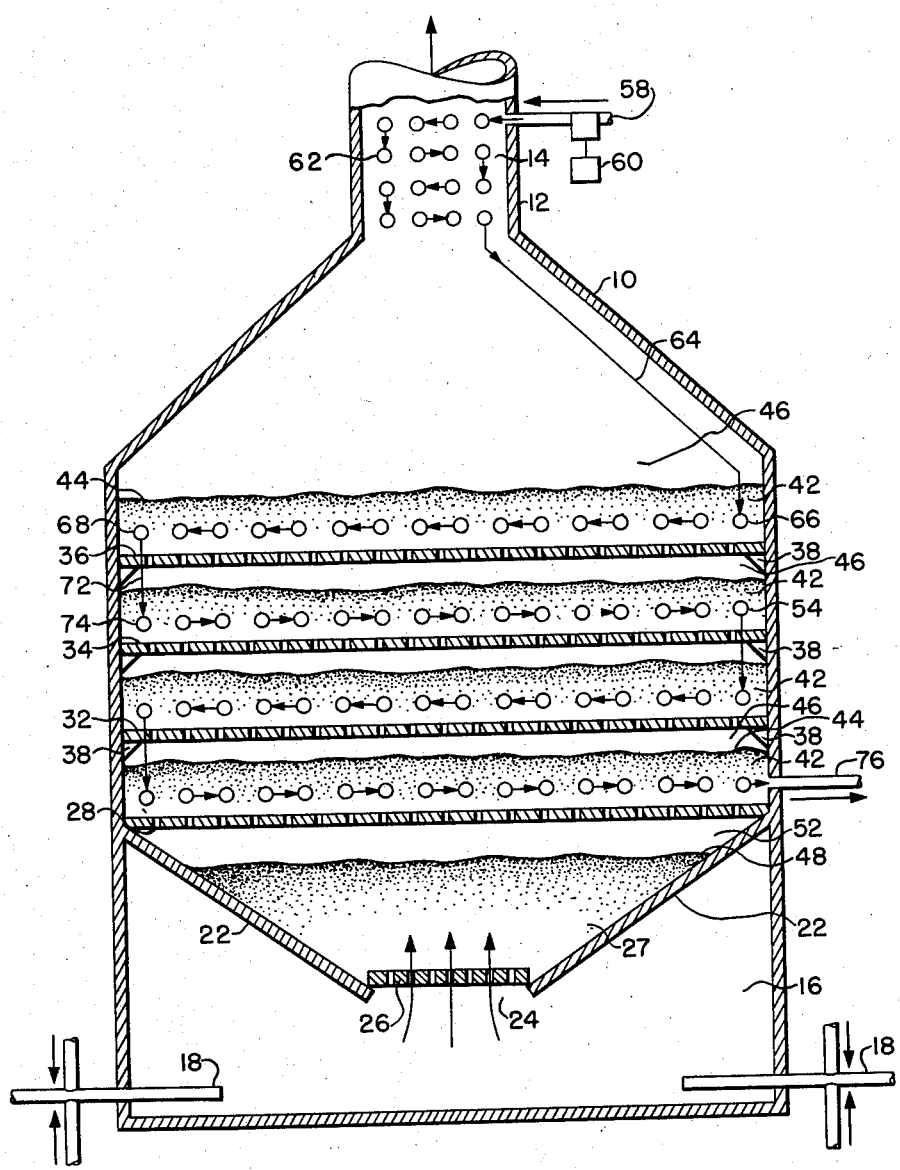
Fig. 1 represents a vertical transverse cross section of one form of apparatus adapted for carrying out the present invention.

Referring now to the drawings, the reference character 10 designates furnace housing having a top stack section 12 which forms a convection heating section 14. The heating apparatus 10 is preferably a box type furnace of rectangular shape so that the oil tubes extend longitudinally of the rectangle. However, other forms of furnaces may be used. The lower portion of the furnace 10 is provided with a heating or burner section 16 provided with burners 18 for receiving air and fuel such as liquid hydrocarbons or gaseous hydrocarbons and air. The burner section 16 of furnace 10 has longitudinally extending inclined flat members 22 which extend from end wall to end wall (not shown) and which are directed toward each other but which are spaced apart at their lower ends as at 24. Members 22 extend from the vertical walls of the housing 10 downward at an angle and are suitably supported in housing 10. Fitted over the opening 24 is a perforated grid or screen 26 through which the hot combustion gases from the burner section are passed and distributed to the fluidized bed of solids 27 arranged above the grid 26 and on the flat members 22. The bed of solids 27 requires an increase in velocity of the upflowing gases to maintain all particles in the furnace fluidized and keeps particles from dropping into the burner zone 16.

The furnace or heating apparatus 10 is provided with horizontally extending grids or screens 28, 32, 34 and 36 spaced one above the other and which are of substantially the same width as the interior of the furnace and of the same length so as to form horizontal partitions spaced vertically in the heating apparatus 10. In this form the vertical movement of the solid particles is restricted by the grids or screens 28, 32, 34 and 36. The openings in the grids or screens are large enough to pass the solid particles but small enough to limit the free vertical movement of the solids from bed to bed. Or the openings in grids or screens 28, 32, 34 and 36 may be smaller than the solid particle size. Preferably the grids are screen grids with openings smaller than the solids to prevent movement of the solids from one section to the other and to maintain separate and distinct fluidized beds.

Lowermost grid 28 is located substantially at the top of inclined members 22 and supported thereby or in any suitable manner. Angular supports 38 are suitably secured to the sides of the furnace and form supporting means for the grids 32, 34 and 36. The grids are provided with openings. Instead of having grids, screens or other similar perforated means may be used. As the combustion gases from the burner section 16 pass up through the grids they fluidize the solids on each grid so that a series of fluidized solids beds are provided in the heating apparatus.

The solids are in finely divided condition and are preferably refractory, inert material such as silica, alumina, kieselguhr, sand, fuller's earth, quartz, spent silica alumina catalyst or the like. The solid particles are preferably of a size of 200–400 standard mesh or smaller. The velocity of the combustion gases passing upwardly through the beds is between about ½ and 2½ ft. per second. Using sand and with a velocity of about 1 ft. per second, the density of the fluidized mixture in the beds will be about 30 lbs. per cubic ft.

Each of the grids 28, 32, 34 and 36 is adapted to support a fluidized bed of solids 42 having an upper level at 44 with a dilute suspension 46 thereabove and below the next higher grid. If desired, the process may be carried out so as to substantially eliminate the dilute phase and so that the entire furnace between the grids is substantially full of dense fluidized turbulent solids. The lowermost fluidized solids section 27 below the bottom grid 28 is also shown with a level 48 and a dilute phase 52 thereabove and below the bottom grid 28.

Submerged in each of the fluidized solid bed sections 42 are oil tubes 54 and as shown diagrammatically in the drawing, these oil tubes are connected by end headers in pairs to form a coil or a continuous conduit for conducting the oil through the fluidized bed sections. In one form of the invention, oil to be heated is passed through line 58 by pump 60 and into the oil tubes 62 in the convection heating section 14 which in reality is a part of the stack for removing combustion gases from the furnace. If desired, a suitable solids separating device such as a cyclone separator may be arranged in the stack of the furnace to recover entrained finely divided solids from the flue gases and return the solids to any of the fluidized beds in the housing 10.

From the convection heating section the oil passes through line 64 to the end oil tube 66 shown at the right in Fig. 1 in the fluidized beds section 42 on the top grid 36. The oil being heated is then passed through the rest of the tubes in the top fluid bed section 42 until the lefthand tube 68 in the top bed section 42 is reached. From here the oil is passed through line 72 to the tube 74 at the left hand section of Fig. 1 in the fluidized bed section 42 resting on the next lower grid 34.

The oil is then passed through the tubes in this fluidized bed section on grid 34 and then on down to the next lower fluidized bed on grid 32 and through the heater tubes in the fluidized bed on grid 32 and then on to the next lower fluidized solids bed on grid 28 and through the heater tubes in this fluidized bed section on grid 28 in a manner similar to that above described. The heated oil is withdrawn through line 76.

As the combustion gases pass up through the grids, they fluidize the solids on each grid member and form dense turbulent liquid-like mixtures which have the appearance of a boiling liquid. With such turbulence, exceedingly good heat exchange is obtained between the solid particles, the combustion gases and the oil in the oil tubes and the oil tubes are uniformly heated. In the arrangement shown in Fig. 1 the fluidized bed section 42 on the bottom grid 28 will be the hottest, the next higher fluidized bed section 42 on the next grid 32 will be cooler and so on up through the remaining grids so that there is a temperature gradient through the furnace. The oil passing through the oil tubes 54 passes from the convection heating section to the coolest fluidized bed 42 on the top grid 36 and is progressively heated as it passes on down through the tubes in the fluidized beds on the lower grids. The oil passing through the tubes on the bottom fluidized bed section 42 on the bottom grid 28 receives the most heat. The heated oil is withdrawn from the heating apparatus through line 76. The grids or screens 28, 32, 34 and 36 prevent intermixing of the solids of the various bed sections and in this way true countercurrent flow is obtained and desired heating of the oil is produced. If desired, the oil tubes in the lowermost fluid solid bed section 42 on the bottom grid 28 may be spaced closer together to reduce the amount of heat being conveyed to the oil in the tubes. This may be desirable when cracking an oil to prevent over-cracking of the oil after it has been heated to the desired cracking temperature.

Figure 2:
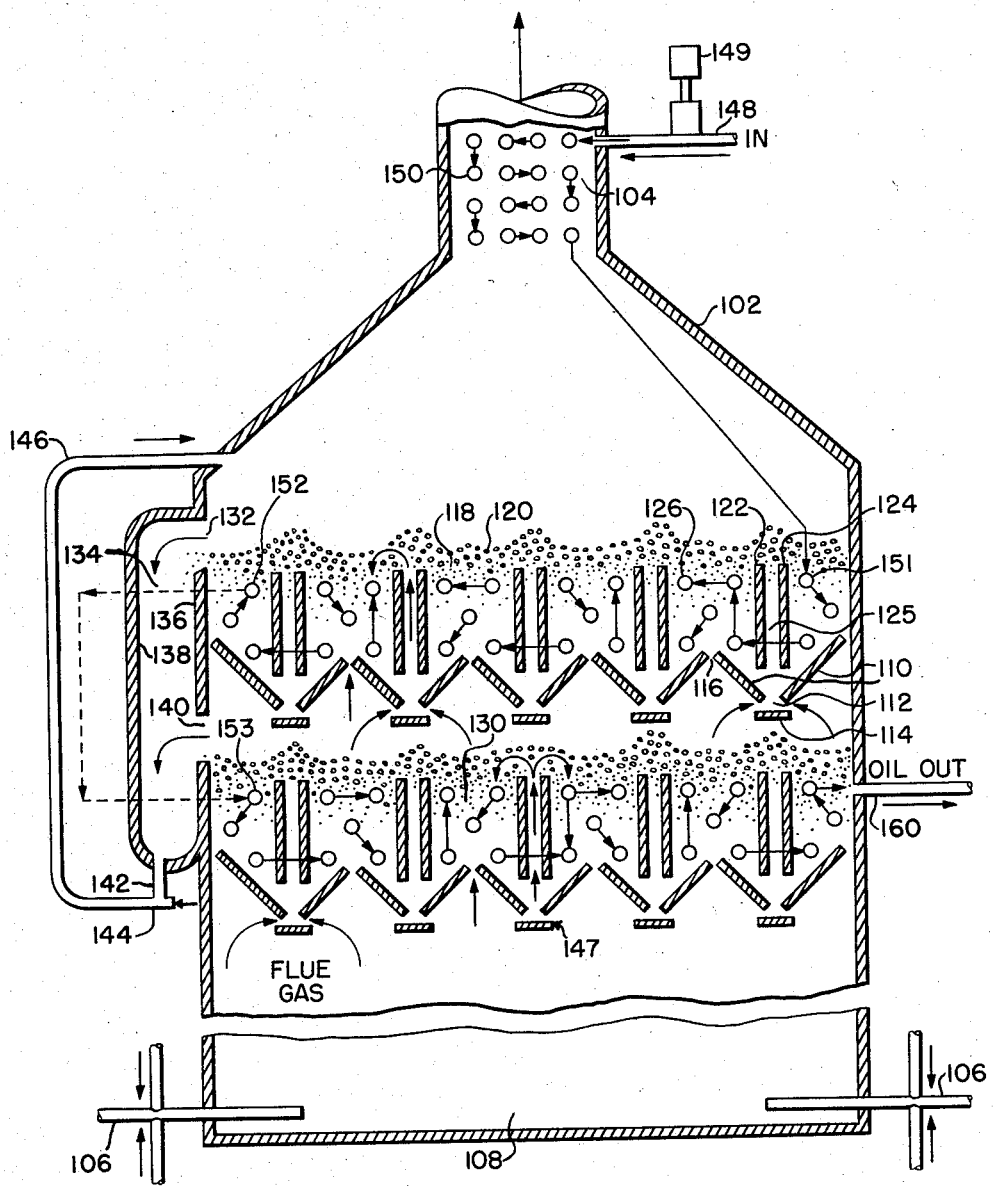
Fig. 2 represents a vertical transverse cross section of another form of apparatus.

Fig. 2 shows a modification of means for supporting the bed sections. The furnace 102 has a top convection heating section 104. While only two fluidized bed sections are shown in Fig. 2 it is to be understood that any number of such bed sections may be used. The furnace is provided with burners 106 for producing and introducing hot combustion gases into the bottom section 108 of the furnace 102. In this form of the invention each of the grids is either formed in one piece or formed of separate sections. The grid member includes a plurality of flat elongated members 110 which are arranged in V-shaped relation with the bottom portions of the angular members spaced as at 112. Arranged below the space 112 is a flat horizontal elongated member 114 which is spaced from the lower ends of plates 110 to provide a passageway for the combustion gas in its travel up the furnace. The furnace shown in Fig. 2 is preferably of the box type and rectangular in shape so that the elongated members 110 and 114 will extend for the length of the furnace and members 110 are in effect elongated flat members arranged in angular relation with each other. The tops of adjacent flat members 110 are spaced apart to leave an opening 116 so as to permit a small amount of gas to pass up between the top portions of adjacent members 110. A fluidized bed of solids 118 having an upper level 120 is arranged and supported by the grid member 110. Openings 116 are smaller than the openings formed by space 112 and member 114 so that more gas passes up through spaces 112 than through openings 116.

Arranged above the opening 112 between the lower ends of the flat elongated plates 110 and extending upwardly in the dense fluidized bed 118 are vertical parallel elongated partitions 122 and 124 which form a vertical channel 125. The partitions 122 and 124 are submerged in the dense fluidized bed of solids 118. Similar partitions are arranged between the rest of the pairs of elongated flat members 110 to form similar channels. Arranged between the channels or sets of partitions forming the channels are oil or heater tubes 126 which are submerged in the dense fluidized solids bed section 118. As shown by the arrows at the right hand of the Fig. 2, below the first set of elongated plates 110, the hot combustion gases pass upwardly around flat member 114 and then up through the passageway 112 formed between the adjacent bottoms ends of the elongated members 110. The combustion gas passes upwardly through the channel 125 formed by the partitions 122 and 124 and forms a fluidized mixture with the solids. The hot mixture of solids and gases flows out the top of the channel 125 and passes downwardly over the tubes 126 arranged in the dense fluidized bed between the several channels.

The small opening 116 at the top of the adjacent flat members 110 permits a slight leakage of combustion gases to maintain the solids in the fluidized bed section fluidized around the oil tubes 126 but forms a denser mixture than that in the channel or passageway 125 so that there is a circulation of solids up through the channel 125, down over the oil tubes and then up through the channel again for receiving additional heat from the combustion gases. This same circulation of solids occurs across the entire fluidized bed on the top grid member and the lower grid member or members.

The combustion gases passing upwardly through the bottom fluidized bed 130 entrain solids with it and these are caught and held back in the top fluidized bed section 118. If the bed level of the top section 118 becomes too high, provision is made for permitting overflow of the fluidized solids and return to the furnace. The furnace 102 is shown as provided at one side with an elongated opening 132 to provide a passageway to permit overflow of fluidized solids from the top bed 118 into a channel or downcomer 134 provided between inner wall 136 and outer wall 138 of the furnace.

A similar opening 140 is provided adjacent the top of the lower fluidized bed section 130 for also permitting overflow of the solids from the lower bed section 130 into the channel 134 if the solids level becomes too high for any reason. The solids collecting in channel 134 flow down into the bottom of the channel into pipe section 142 into which gas is introduced at 144 to form a less dense suspension and the dilute or less dense suspension is returned through line 146 into the top of the furnace 102 above the top dense bed 118. Instead of returning the solid particles to the top of furnace 102, the solid particles may be returned to the lower fluidized bed 130 either in a dense fluidized condition in a standpipe or as a suspension in gas.

The hot combustion gases passing up through the furnace 102 first pass through the bottom fluidized bed section 130 on bottom grid 147 which is of the same construction as the top grid member above described in detail and then through the top fluidized bed section 118 so that the bottom bed section 130 is at a higher temperature than the top bed section 118. As above pointed out two or more such bed sections may be used with the temperature of the beds decreasing from the bottom up. Oil is introduced through line 148 by pump 149. The oil from the line 148 passes into the tubes 150 in the convection heating section 104 and then is passed to the oil tubes 151 at the right hand section of Fig. 2 and then passed generally to the left through the remaining oil tubes in the fluidized bed section 118 to the oil tubes 152 at the left in Fig. 2 in bed 118. The oil then passes to tubes 153 at the left hand of Fig. 2 in the lower fluidized bed 130 and then through the remaining tubes in the lower fluidized bed section 130 passing from left to right and the heated oil is withdrawn through line 160.

Figure 3:
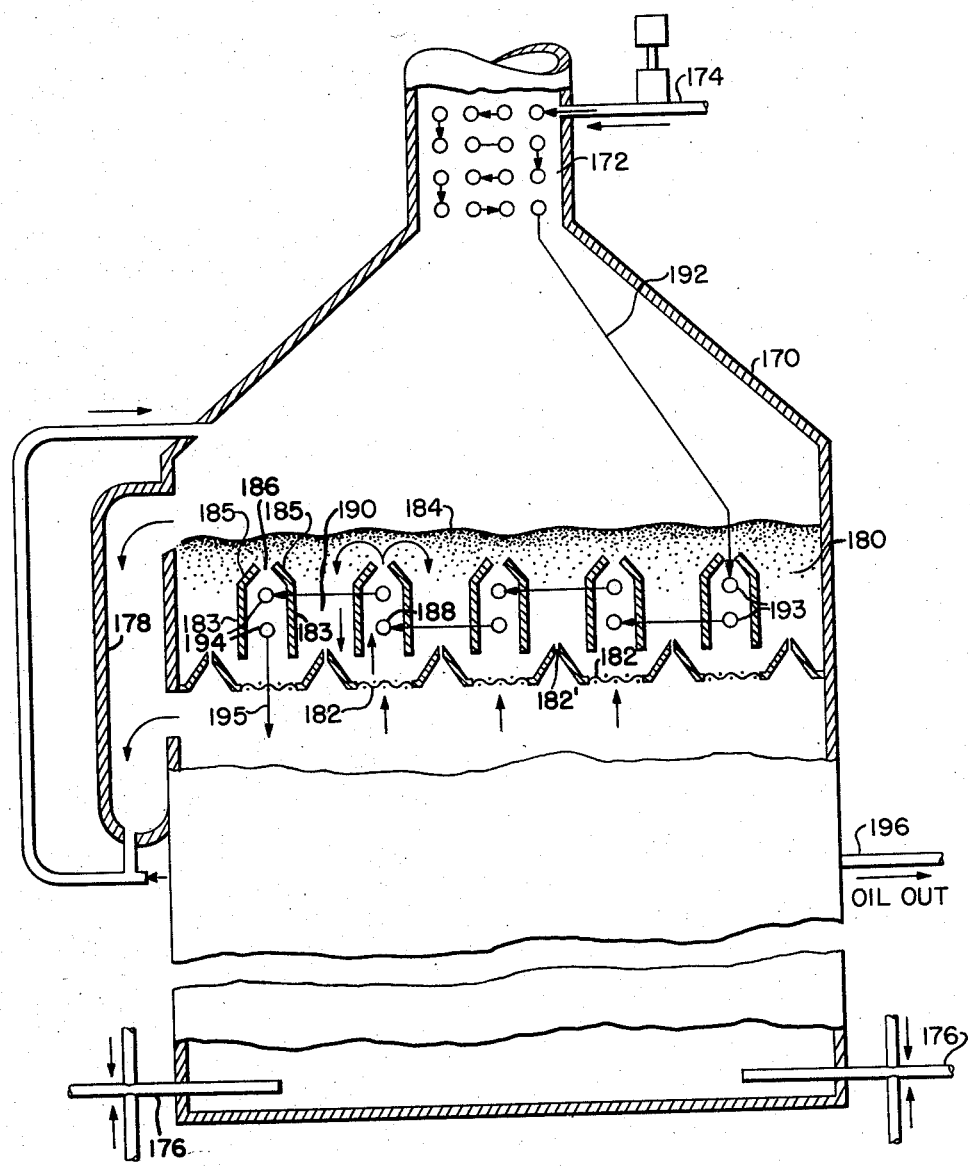
Fig. 3 represents a vertical transverse cross section of another form of apparatus with certain parts omitted to facilitate the disclosure.

Fig. 3 shows an arrangement similar to that shown in Fig. 2 except that a different form of grid member is used and the oil tubes in the fluidized bed section are arranged in a different manner. Generally the furnace 170 has a convection heating section 172, an oil inlet line 174, burners 176 and an overflow section 178 similar to that shown in Fig. 2. Two or more fluidized bed sections may be provided in this form of the invention but only the top fluidized bed section 180 is shown in the drawing.

In this form of the invention the grid is made up of screen portions 182 separated by connecting members which are substantially inverted V-shaped in cross section. The top of the inverted V-shaped section is preferably provided with small apertures 182' to permit a small amount of combustion gas to pass upwardly through these openings. As pointed out above in connection with the other forms of apparatus, that shown in Fig. 3 is also preferably a box type furnace of rectangular shape so that the grid members are elongated and horizontally arranged and extend entirely across the furnace from wall to wall.

Vertical elongated partitions 183 similar to those described in connection with Fig. 2 are arranged in spaced relation and extend from a level above the screened portions 182 of the grid to a level below the top 184 of the top fluidized bed section 180. The upper portions of the partitions 183 have inwardly inclined sections 185 which are spaced at their upper and inner ends at 186 to permit upward flow of the fluidized solids passing upwardly with the hot combustion gases introduced through the screened portions 182. Arranged within the channel formed by the parallel partition 183 are oil or heater tubes 188.

Hot combustion gases passing upwardly through the screen sections 182 fluidize the solid particles around the oil or heater tubes 188 and the fluidized mixture passes upwardly through the opening 186 between the top portions 185 of the channel members 183 and the fluidized solids then pass down around the outside of the channel for recirculation again from above the screen portions through the channel for contact with the oil tubes. The openings 182' in the top of the inverted V-shaped sections are arranged between adjacent pairs of partitions 183 to permit introduction of only a small amount of a combustion gas into the space above the inverted V-shaped sections and between the pairs of adjacent partitions and as a result this solids mixture in spaces 190 is more dense than that within the channel members 183 and circulation of the solids results as described.

The oil introduced into the convection heating section is passed through line 192 to the oil tubes 193 at the right hand side of Fig. 3 and then passed across the tubes in the fluidized bed section 180 toward the left and then from the left hand tube 194 in the top bed section 180 is passed through line 195 through the tubes on the next lower fluidized bed section (not shown) and the heated oil is withdrawn through line 196.

The lower portions of the furnaces of Figs. 2 and 3 are preferably supplied with slanting bottom flat members like 22 in Fig. 1, a bottom grid like 26 in Fig. 1 and a bottom fluidized bed on the grid like bed 27 in Fig. 1. Figs. 2 and 3 show different forms of grids. Also in Fig. 2 the dense fluidized solids mixture flows down over the tubes whereas in Fig. 3 the less dense solids mixture passes up over the tubes.

In a specific example for heating a gas oil to cracking temperature the form of the invention shown in Fig. 1 will be referred to. The furnace is about 10 ft. by 32 ft. in dimension and the convection heating section 14 is about 2⅙ ft. by 11 ft. The heater tubes are about 4 inches in outside and about 3 inches in inside diameter. There are 69 tubes in convection heating section 14. About 150 barrels per hour of virgin gas oil under pressure of about 250 lbs. p.s.i.g. and at a temperature of about 150° F. are passed through line 58 into the oil tubes 62 in the convection heating section to preheat the gas oil to a temperature of about 650° F.

The heated gas oil is then passed through the tubes 66 to 68 in the top fluidized bed 42 wherein the temperature of gas oil is raised to about 800° F. There are 12 oil tubes in this top fluidized bed 42. The gas oil is then passed through the oil tubes in the next lower fluidized bed section 42 on the next lower grid 34 and the gas oil is heated to about 900° F. In this bed section 42 there are 12 oil tubes.

The heated gas oil is then passed through the oil tubes in the next lower fluidized bed section on grid 32 wherein the gas oil is heated to about 1000° F. In this fluidized bed section 42 on the next lower grid 32 there are 12 oil tubes. The heated gas oil is then passed through the oil tubes in the fluidized bottom section 42 on the bottom grid 28 wherein the gas oil is maintained at a cracking temperature of 1050° F. and the cracked gas oil is withdrawn through line 76 and passed to a fractionator (not shown) to separate gasoline from higher boiling constituents and from gas. There are 12 oil tubes in the bottom fluidized bed section 42 on the bottom grid 28.

In this specific example the fluidized solid particles are silica alumina cracking catalyst having a particle size of about 200 mesh to 400 mesh or finer. The burners 18 are fired with Bunker C fuel oil and the superficial velocity of the combustion gases passing upwardly through the fluidized beds is about 1 ft. per second.

The heat density in the convection heating section 14 is about 6,000 B.t.u./hr./ft.$^2$ and the heat density in the fluidized beds is about 15,000 B.t.u./hr./ft.$^2$.

Instead of using inert solid particles in the fluidized beds in the heating furnaces herein described, it is within the purview of this invention to add coke particles from any source and preferably coke particles from a fluid coking process to the inert solids in the fluid beds. Such coke particles are of a size from a few microns to 300 or 400 microns or larger in size. Or the entire fluidized beds may be made up of such coke particles which are supplied to the fluid beds in any suitable manner. The coke particles are burned as a fluidized mixture by air which acts as the fluidizing means. When coke particles are used, an added supply of air must be provided for the furnace and the burners 18 may be eliminated or only used as a secondary source of heat. If the burners are eliminated the air source for the burners may be used to supply air for burning the coke.

While a specific example including specific conditions has been given it is to be understood that this is by way of illustration only and the invention is not to be restricted to it. The invention may also be used in refrigeration.

The cracking temperature may vary between about 900° and 1100° F. The invention may be used generally for heating fluids without being restricted to cracking temperatures.

What is claimed is:

1. An apparatus for changing the temperature of fluids including a housing provided at its bottom portion with burners for supplying hot combustion gases to the bottom of the housing, bottom partitions arranged at an angle from the horizontal and extending from the wall of the housing and being in spaced relation at their lower adjacent ends, a grid member arranged above the opening formed by the spaced apart lower ends of the inclined partitions and supporting and retaining finely divided solids thereon, a plurality of horizontally arranged elongated perforated members in vertical spaced relation in said housing, each of said perforated members supporting and retaining a bed of finely divided solids thereon, means for supporting said perforated members, a plurality of sets of tubes serially connected, with one set of tubes arranged above each of said perforated members and submerged in the bed of finely divided solids thereon, said solids being adapted to be fluidized and maintained in a fluidized condition on the perforated members by the upflowing hot combustion gases from the burners whereby fluid passing downwardly through the serially connected tubes passes countercurrent to the upflowing combustion gases.

2. An apparatus for changing the temperature of fluids including a housing provided at its bottom portion with burners for supplying hot combustion gases to the bottom of the housing, a plurality of horizontally arranged elongated perforated grid members arranged in vertical spaced relation in said housing and of substantially the same size and contour as the interior of said housing, each of said perforated members supporting and retaining a bed of finely divided solids thereon, means for supporting said perforated members, a plurality of sets of tubes serially connected, with one set of tubes arranged above each of said perforated members and submerged in the bed of finely divided solids supported thereon, said solids being adapted to be fluidized and maintained in a fluidized condition on the perforated members by the upflowing hot combustion gases from the burners whereby fluid passing downwardly through the serially connected tubes passes countercurrent to the upflowing combustion gases without any substantial passing of solids from one bed to another.

3. An apparatus according to claim 2 wherein pairs of elongated flat vertical parallel plates are arranged above each perforated grid member to form channels along sections of said tubes in the beds of solids on said grid members to promote vertical circulation of the solids around said tubes on each grid member.

4. An apparatus according to claim 3 wherein said channel forming vertical plates are between said tubes in said beds of solids.

5. An apparatus according to claim 3 wherein said channel forming vertical plates are arranged around tubes in said beds of solids.

6. An apparatus according to claim 3 wherein said housing is provided with an opening adjacent the top of each bed of fluidized solids leading into a single chamber for collecting solids overflowed from said beds of fluidized solids and means for returning solids from the bottom of said chamber to a region above the top bed of fluidized solids in said housing.

7. An apparatus for changing the temperature of fluids including a housing, means for supplying fluidizing gas at the bottom of said housing, a plurality of horizontally arranged grid members arranged in vertical spaced relation in said housing, each of said grid members supporting and retaining a bed of finely divided solids thereon, a plurality of sets of tubes serially connected, with one set of tubes arranged above each of said grid members and submerged in the bed of finely divided solids thereon, a bottom smaller grid member supporting a bed containing no submerged tubes of finely divided solids to prevent downward passage of solids below said smaller grid member, said solids being adapted to be maintained in a fluidized condition on said grid members by the upflowing fluidizing gas.

8. A method of heating hydrocarbon fluids which comprises passing hydrocarbon fluid as a continuous confined stream surrounded by a dense fluidized bed of hot solids arranged at an upper portion of a heating zone, supplying hot combustion gases to the lower portion of said heating zone for upward passage therethrough, then passing the hydrocarbon oil as a confined stream submerged in a second dense fluidized bed of hot solids maintained at a higher temperature than said first bed of hot fluidized solids and arranged at a lower level in the same heating zone by the hot upflowing combustion gases, then passing the heated hydrocarbon fluid as a confined stream submerged in at least another fluidized bed of hot solids maintained at a higher temperature than said second bed of fluidized solids in said heating zone by the upflowing hot combustion gases and arranged at a lower level and withdrawing heated hydrocarbon fluid from said heating zone.

9. A method of heating fluids which comprises passing a fluid as a continuous confined stream through a heating zone provided with separate vertically spaced horizontally arranged fluidized solids beds, said confined stream flowing generally downward through said heating zone and having portions submerged in said fluidized solids beds, supplying hot combustion gases in the bottom portion of said heating zone for upward flow therethrough and for fluidizing said solids beds, the lowest bed of solids being hottest and withdrawing heated fluid from the confined stream from the lowermost solids beds.

References Cited in the file of this patent

UNITED STATES PATENTS

| | | |
|---|---|---|
| 2,389,133 | Brassert et al. | Nov. 21, 1945 |
| 2,397,485 | Hemminger | Apr. 2, 1946 |
| 2,432,745 | Gary | Dec. 16, 1947 |
| 2,493,498 | Peery | Jan. 3, 1950 |
| 2,557,680 | Odell | June 19, 1951 |
| 2,589,984 | Borcherding | Mar. 18, 1952 |
| 2,664,967 | Molstedt | Jan. 5, 1954 |
| 2,710,279 | Siecke | June 7, 1955 |
| 2,729,428 | Milmore | Jan. 3, 1956 |

OTHER REFERENCES

Nelson: Petroleum Refining Engineering, page 526 (1949).